(12) United States Patent
Dickinson et al.

(10) Patent No.: US 11,146,627 B1
(45) Date of Patent: Oct. 12, 2021

(54) TECHNIQUES FOR UTILIZING NETWORK DESTINATION IDENTIFIERS SIMULTANEOUSLY ANNOUNCED FROM MULTIPLE LOCATIONS

(71) Applicant: Amazon Technologies, Inc., Seattle, WA (US)

(72) Inventors: Andrew B. Dickinson, Seattle, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 161 days.

(21) Appl. No.: 16/512,208

(22) Filed: Jul. 15, 2019

Related U.S. Application Data

(63) Continuation of application No. 15/217,864, filed on Jul. 22, 2016, now Pat. No. 10,412,156, which is a continuation of application No. 13/168,508, filed on Jun. 24, 2011, now Pat. No. 9,407,539.

(51) Int. Cl.
*H04L 29/08* (2006.01)
*H04L 12/725* (2013.01)

(52) U.S. Cl.
CPC ........ *H04L 67/1021* (2013.01); *H04L 45/306* (2013.01)

(58) Field of Classification Search
CPC combination set(s) only.
See application file for complete search history.

(56) References Cited

U.S. PATENT DOCUMENTS

| | | |
|---|---|---|
| 2008/0040306 A1 | 2/2008 | Ma |
| 2008/0235400 A1* | 9/2008 | Slocombe ........... H04L 61/2069 709/245 |
| 2008/0279222 A1 | 11/2008 | Fuller et al. |
| 2009/0080420 A1 | 3/2009 | Van De Poel et al. |
| 2009/0172192 A1 | 7/2009 | Christian et al. |
| 2009/0248886 A1* | 10/2009 | Tan ..................... H04L 12/1836 709/231 |
| 2010/0098072 A1 | 4/2010 | Satterlee et al. |
| 2011/0082916 A1* | 4/2011 | Swanson ........... H04L 29/08081 709/219 |

(Continued)

OTHER PUBLICATIONS

U.S. Appl. No. 13/168,508 , "Final Office Action", dated Mar. 31, 2014, 13 pages.

(Continued)

*Primary Examiner* — Philip J Chea
*Assistant Examiner* — Mohammed Ahmed
(74) *Attorney, Agent, or Firm* — Kilpatrick Townsend & Stockton LLP

(57) ABSTRACT

Systems and methods utilize network destination identifiers, such as IP addresses, that are simultaneously advertised from multiple locations. The network destination identifiers may be announced in multiple geographic regions. Network traffic routed to devices advertising the network destination identifiers may be routed to appropriate endpoints. When a device receives such traffic, it may send the traffic to an endpoint in a network served by the device. In some instances, such as when such an endpoint is not available, the network traffic may be sent to another network that is served by another device that advertises the network destination identifiers.

19 Claims, 13 Drawing Sheets

(56) References Cited

U.S. PATENT DOCUMENTS

2011/0099259 A1* 4/2011 Lyon .................. H04L 67/1029
709/223

OTHER PUBLICATIONS

U.S. Appl. No. 13/168,508 , "Non Final Office Action", dated Aug. 7, 2013, 15 pages.
U.S. Appl. No. 13/168,508 , "Non-Final Office Action", dated Jan. 2, 2015, 15 pages.
U.S. Appl. No. 13/168,508 , "Notice of Allowance", dated Apr. 13, 2016, 16 pages.
U.S. Appl. No. 15/217,864 , "Non Final Office Action", dated Sep. 17, 2018, 14 pages.
U.S. Appl. No. 15/217,864 , "Notice of Allowance", dated May 20, 2019, 8 pages.

* cited by examiner

TECHNIQUES FOR UTILIZING NETWORK DESTINATION IDENTIFIERS SIMULTANEOUSLY ANNOUNCED FROM MULTIPLE LOCATIONS

CROSS REFERENCE TO RELATED APPLICATIONS

This application is a continuation of U.S. application Ser. No. 15/217,864, filed Jul. 22, 2016, and entitled "TECHNIQUES FOR UTILIZING NETWORK DESTINATION IDENTIFIERS SIMULTANEOUSLY ANNOUNCED FROM MULTIPLE LOCATIONS", which is a continuation of Ser. No. 13/168,508, filed Jun. 24, 2011, granted as U.S. Pat. No. 9,407,539, on Aug. 2, 2016, and entitled "TECHNIQUES FOR UTILIZING NETWORK DESTINATION IDENTIFIERS SIMULTANEOUSLY ANNOUNCED FROM MULTIPLE LOCATIONS", the contents of which are herein incorporated in its entirety.

BACKGROUND

Operating an organization often involves the operation of and interaction with computer networks that interconnect numerous computing systems. Various computing systems may, for example, support the operations of an organization, such as a business. Many computing systems may be co-located (e.g., as part of a local network) and/or located in multiple distinct geographical locations (e.g., connected via one or more private or public intermediate networks). For example, an organization may operate one or more data centers that house significant numbers of interconnected computing systems. Data centers may be private data centers that are operated by and on behalf of a single organization, public data centers that are operated by entities as businesses, and/or combination private/public data centers. It is common for data centers to be participants in a communications network, such as the Internet. Data centers may, for example, be used to provide services that are accessed from outside of the data centers. Over time, organizations may develop complex computing environments that support their operations, often requiring substantial investments in technology.

In many instances, organizations make computing resources available from multiple geographic locations. Network-accessible services, for example, may be provided by deploying servers and possibly other computing resources in multiple geographic locations. By geographically distributing computing resources that implement a network-accessible service, the service may be made robust. For instance, if a set of resources in one region fails, for example due to a power outage and/or network failure, the service may be accessed from another region. As another example, geographically distributing computing resources can generally improve latency and other metrics on network performance by providing the service from a location that is geographically closer. Deploying resources in multiple geographic regions, however, introduces complexities for resource management which, if not effectively taken into account, can diminish the advantages of maintaining geographically distributed systems. Dealing with such complexities is, generally, not a trivial aspect of resource management.

BRIEF DESCRIPTION OF THE DRAWINGS

Various embodiments in accordance with the present disclosure will be described with reference to the drawings, in which.

DETAILED DESCRIPTION

Figure 1:
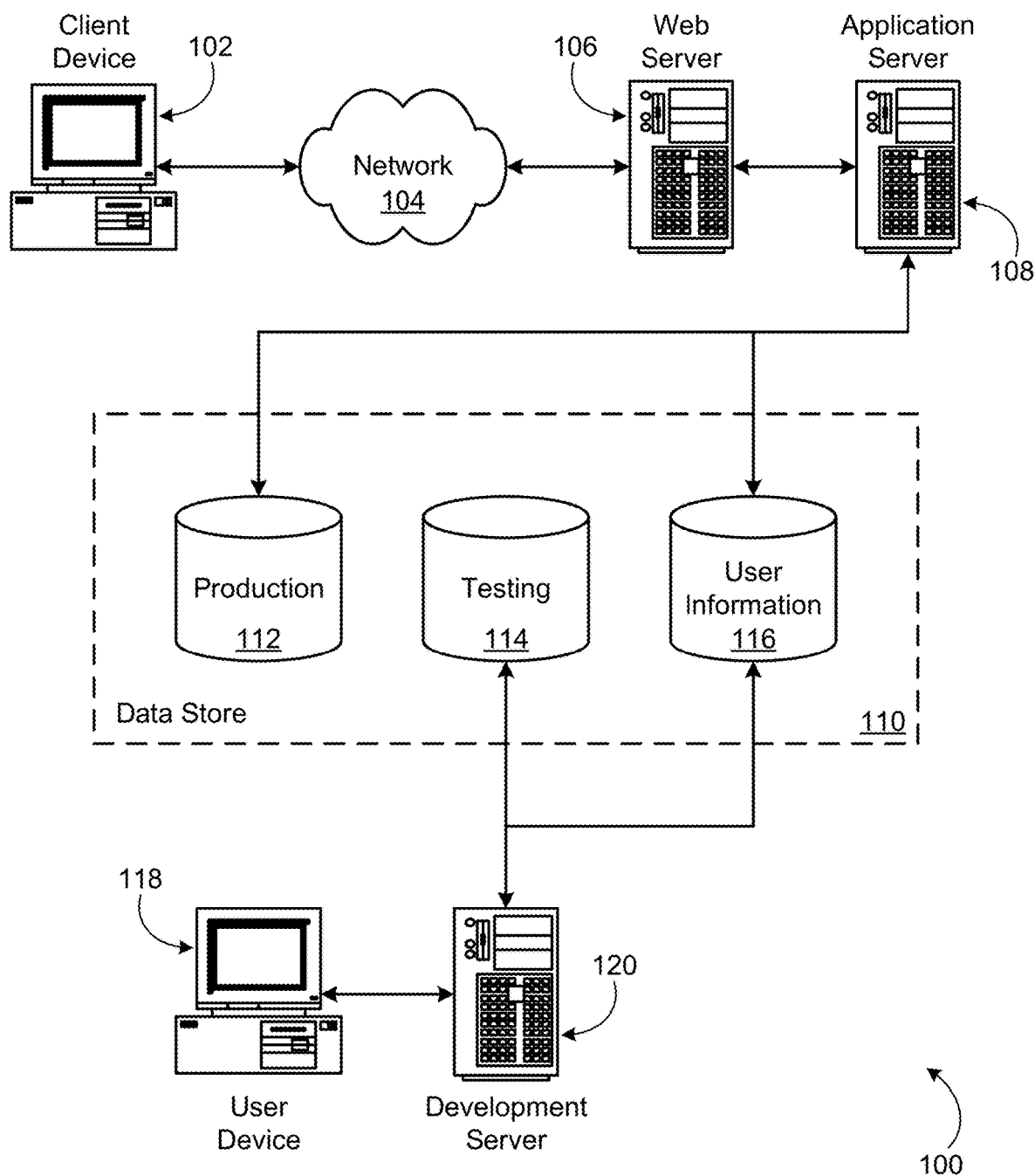
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for managing network traffic. The network traffic may be managed on behalf of one or more customers of a computing resource provider, although techniques of the present disclosure are applicable in other contexts, such as management of traffic by an organization for itself. In various embodiments, a block of network destination identifiers are advertised simultaneously from multiple geographic locations. The network destination identifiers may be identifiers of a publicly addressable communications network. For instance, the network destination identifiers may be Internet protocol (IP) addresses and may be generally referred to herein as anycast addresses. In an embodiment, the block is at least a classless inter-domain routing (CIDR)/24 block of IP addresses, that is, having enough IP addresses for at least two-hundred and fifty-four hosts. Advertising a network destination identifier may include performing one or more actions that cause at least some network traffic addressed to the network destination identifier to be sent to one or more devices involved in advertising the network destination. For example, advertising a block of IP addresses may include pushing the block onto one or more Internet routing tables maintained by Internet routing devices of a third party. The devices may identify the network destination to other devices involved in routing network traffic. The devices may be, for example, border gateway protocol (BGP) routers that advertise BGP routes for IP addresses to other BGP routers.

In various embodiments, a network destination identifier is assigned to multiple endpoints in the network. An endpoint may be a device configured to receive network traffic. The endpoint may be configured to perform one or more actions upon receipt of network traffic. For example, the endpoint may be configured to forward received traffic to one or more other devices and/or to generate and send network traffic in response to received traffic. The endpoints to which the network destination identifier is assigned may be located in different geographic locations. For example, the endpoints may be located in different data centers or, generally, in different facilities. Multiple network destination identifiers may each be assigned to multiple endpoints. For example, an organization may advertise a set of network destination identifiers simultaneously and assign each member of at least a subset of the network destination identifiers to multiple endpoints. As a more specific example, the organization may be a computing resource provider and the endpoints may correspond to resources of the computing sources provider that are maintained on behalf of customers of the computing resource provider. A customer of a computing resource provider may, for example, assign an anycast destination identifier to resources that are operated in multiple facilities of the computing resource provider.

When a unit of network traffic addressed to an anycast destination identifier, such as an IP packet, is received, the network traffic may be routed to at least one of the endpoints to which the anycast destination identifier is assigned. Routing the network traffic may be performed in various ways. For example, if the network traffic is received at a location that is close to an endpoint, such as an endpoint that is in the same facility as a device that received the network traffic or in a close facility, the network traffic may be routed to the close endpoint. If there is not a close endpoint, the network traffic may be routed to another location, such as another facility in another geographic location, in which there is an endpoint to which the anycast destination identifier is assigned. A mapping of the anycast destination identifier with one or more endpoints to which the anycast destination identifier is assigned may be used in routing decisions for the received network traffic. The mapping may be referenced to determine whether to route the received network traffic to a close endpoint (if one exists) or to another location.

Various techniques may be used to route received network traffic to another location. In an embodiment, one or more private channels are used to transfer the received network traffic to another facility in which an endpoint of the anycast destination identifier is located. For example, a virtual private network (VPN), generic routing encapsulation (GRE) tunnel, private backbone, IP security (IPsec) tunnel, and/or dark-fiber network may be used to transfer the received network traffic to the other location. An interior gateway protocol (IGP) may be used to advertise a specific route for routing the network traffic to an endpoint. In another embodiment, network address translation is performed on the received network traffic to provide the received network traffic with an address of an intermediate device in another location. The translated network traffic may be sent over a private and/or public network to the intermediate device which may modify the network traffic again so that the network traffic may be routed to the endpoint. The intermediate device may, for example, modify the network traffic to have a destination address that corresponds to the anycast destination identifier. The corresponding address may be, for instance, a private destination identifier that is used for routing traffic inside of a private network in which the endpoint participates. Outgoing network traffic, such as traffic in response to received network traffic managed in accordance with the various embodiments, may be dispatched onto a public network with a source address that is the anycast destination identifier.

In many instances, a set of resources having members to which an anycast destination identifier is assigned may change over time. As an example, the set may increase or decrease over time according to changing needs for the resources. A customer of a computing resource provider may, for example, use such a set of resources to provide a publicly or otherwise accessible service to others. As demand for the service increases and/or decreases, the customer may increase or decrease the number of endpoints associated with the anycast destination identifier accordingly. Such changes, in various embodiments, may result in changes to the way in which received network traffic is managed. For example, a customer who has computing resources in a facility of a computing resource provider may need additional computing resources. The computing resource provider may not, in all instances, have available capacity to fulfill the need in the same facility. To fulfill the need, therefore, the computing resource provider may allocate resources in a different facility and may assign the anycast destination identifier to the allocated resources. Various devices that participate in routing received network traffic may be reconfigured such that at least a portion of received network traffic to the anycast destination identifier is routed to the newly allocated resources. As an illustrative example, if resources are allocated in a region in which resources associated with the anycast destination identifier were not previously located, one or more devices in the region may be reconfigured to route received network traffic to the newly allocated resources in the region when possible. Other variations, many of which are described below, are also within the scope of the present disclosure.

Various approaches may be implemented in various environments for various applications. For example, FIG. 1 illustrates components of an example environment 100 for implementing aspects of the present disclosure in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
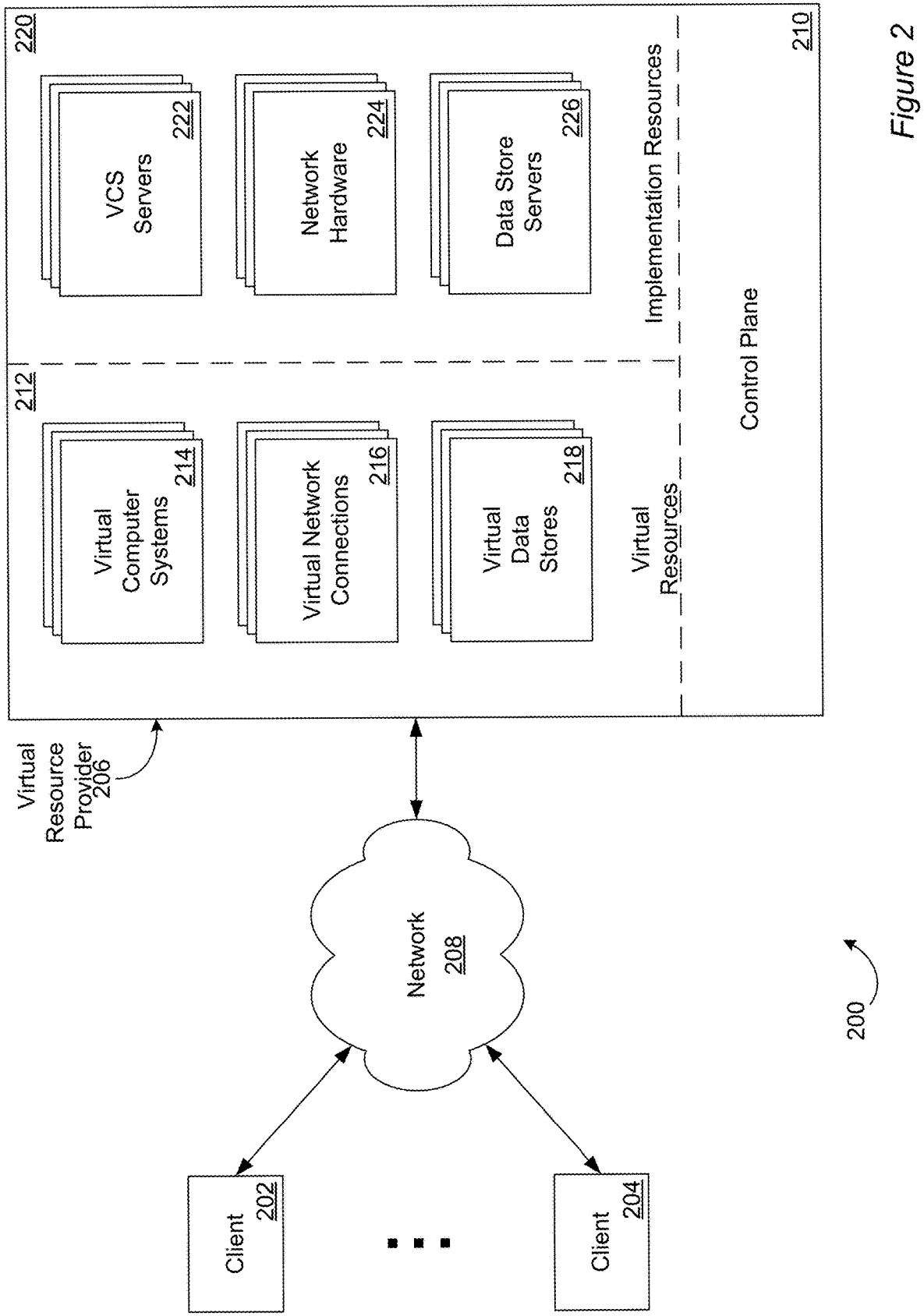
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may correspond to computing devices such as the computing device 102 of FIG. 1 and/or client programs incorporated into such computing devices. The ellipsis between the client 202 and the client 204 indicates that the virtual resource provisioning architecture 200 may include any suitable number of clients (e.g., thousands, millions, and more) although, for clarity, only two are shown in FIG. 2.

One or more of the clients 202-204 may be utilized by one or more customers of the virtual resource provider 206 to interact with the control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable virtual resources. Examples of suitable virtual resources 212 include virtual computer systems 214, virtual network connections 216, and virtual data stores 218, as well as virtual resources not shown in FIG. 2 such as specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable implementation resources 220. Each of the virtual resources 212 may be implemented by a set of the implementation resources 220. In at least one embodiment, various implementation resources of the implementation resources 220 may be configured to participate in implementing, at least in part, multiple virtual resources of the virtual resources 212. Examples of suitable implementation resources 220 include virtual computer system (VCS) servers 222, network hardware 224, and data store servers 226, as well as implementation resources not shown in FIG. 2 and/or others. The control plane 210 may process virtual resource provisioning requests, manage allocation of virtual resources 212 to implementation resources 220 and/or manage allocation of implementation resources 220 to virtual resources 212, as well as provide for associated cost accounting services. An example virtual resource provider control plane in accordance with at least one embodiment is described below in more detail with reference to FIG. 10.

When a particular implementation resource of the implementation resources 220 participates in the implementation of multiple virtual resources of the virtual resources 212, the implementation resource may become contended, for example, the implementation resource may receive sufficient service requests from the multiple virtual resources that request servicing time increases. Contended implementation resources can be a source of unintended and/or unauthorized information transfer between virtual resources, for example, based at least in part on variation in request servicing time. In at least one embodiment, a set of customers may establish a barrier to such information transfer to other customers of the virtual resource provider 206 at least in part by requesting that virtual resources associated with the set of customers be provisioned with dedicated implementation resources. Such barriers may lower a probability that one or more of the other customers of the virtual resource provider gains unauthorized read and/or write access to information (including unpublished information) concerning the virtual resources of the set of customers. Implementation resource dedication boundaries, defining implementation resource dedication units, may correspond to boundaries between physical and/or hardware components including boundaries due to physical barriers and/or physical separations, as well as to hard (e.g., hardware enforced) scheduling and/or timing boundaries, and suitable combinations thereof.

Figure 3:
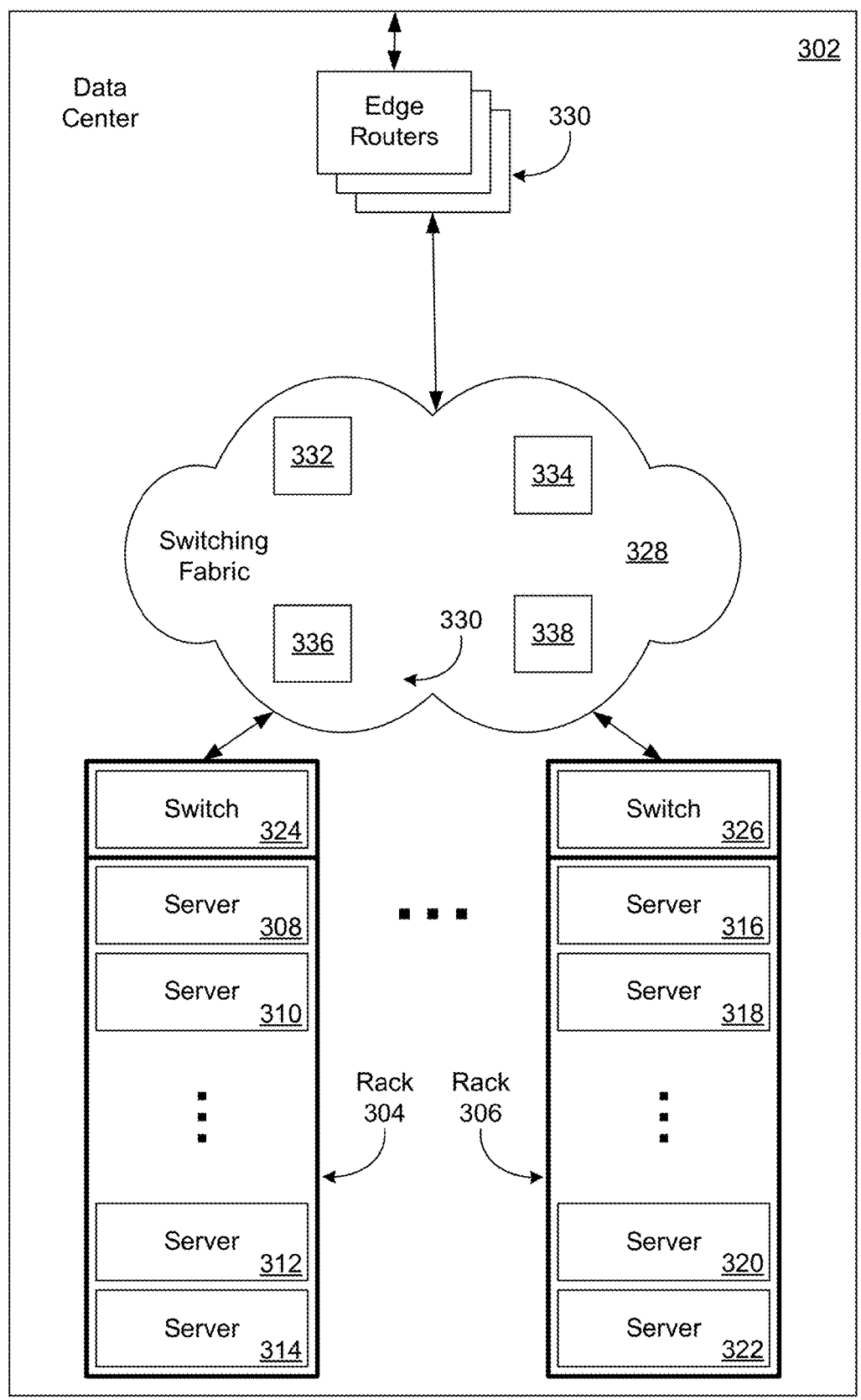
FIG. 3 is a schematic diagram depicting further aspects of the example data centers in accordance with at least one embodiment.

FIG. 3 depicts further aspects of data centers in accordance with at least one embodiment. A data center 302 may include multiple server racks 304-306. The data center 302 is an example of one or more data centers that may be used in various embodiments of the present disclosure, such as data centers shown in FIG. 4. The ellipsis between the server rack 304 and the server rack 306 indicates that the data center 302 may include any suitable number of server racks although, for clarity, only two are shown in FIG. 3. Each server rack 304-306 may participate in maintaining services such as electric power and data communications to multiple server computers 308-314 and 316-322. Again, the ellipses indicate that the server racks 304-306 may include any suitable number of server computers. For example, the server computers 308-322 may include one or more VCS servers 222 (FIG. 2) and/or one or more data store servers 226. Each server 308-322 may correspond to an implementation resource dedication unit.

In FIG. 3, each server rack 304-306 is depicted as including a rack switch 324-326. The rack switches 324 and 326 may be responsible for switching packets of digital data to and from their respective sets of server computers 308-314 and 316-322. Each rack switch 324-326 may correspond to an implementation resource dedication unit. However, in the case (depicted in FIG. 3) that the server rack 304-306 includes one rack switch 324-326, dedicating the rack switch 324-326 to a particular set of customers of the virtual resource provider 206 (FIG. 2) causes dedication of the respective server rack 304-306. This is an example of dedication of a component (an implementation resource dedication sub-unit) of an implementation resource dedication unit causing dedication of the containing dedication unit ("containing unit dedication") in accordance with at least one embodiment. Implementation resources dedication units may indicate which (if any) of their sub-units cause containing unit dedication.

The rack switches 324-326 may be communicatively linked to a data center switching fabric 328 and then to a set of edge routers 330 that connects the data center 302 to one or more other computer networks including the Internet. The switching fabric may include any suitable set of networking components including multiple interconnected switches 332-338 (for clarity, only four are shown in FIG. 3) of one or more switch types arranged in one or more switching layers, as well as routers, gateways, bridges, hubs, repeaters, firewalls, computers, and suitable combinations thereof. In at least one embodiment, the rack switches 324-326 and the edge routers 330 are considered part of the switching fabric 328. The rack switches 324-326, the edge routers 330, and the components of the switching fabric 328 are examples of the network hardware 224 of FIG. 2.

Portions of the switching fabric 328, sets of switching fabric 328 networking components such as sets of the switches 332-338, and/or the edge routers 330 may correspond to implementation resource dedication units. Alternatively, or in addition, a particular set of customers of the virtual resource provider 206 (FIG. 2) may specify that virtual resources of the set of customers be provisioned with a set of dedicated data paths and/or channels (collectively, "data paths") through the switching fabric 328 and/or the edge routers 330. With respect to dedicated data paths, the implementation resource dedication units may correspond to physical data paths such as sets of wires and/or cables. Alternatively, or in addition, the implementation resource dedication units may correspond to hard scheduled communication time slots in a synchronous communication scheme.

Figure 4:
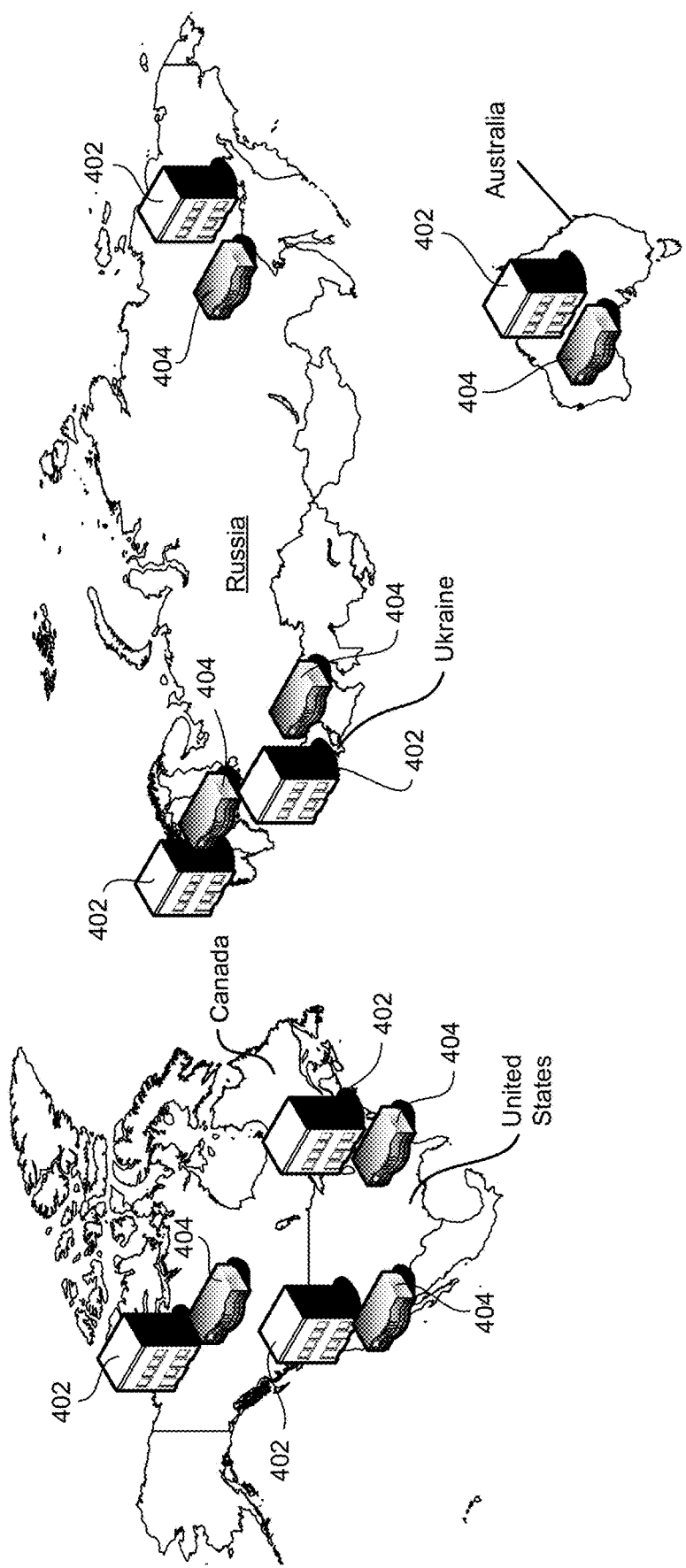
FIG. 4 illustrates global deployment of multiple POPs in accordance with at least one embodiment.

A computing resource provider, such as a virtual resource provider described above, may deploy or at least utilize multiple points of presence (POPs) in various geographic regions. The POPs may be, but are not necessarily, co-located with a data center. In an embodiment, each POP is operable to announce border gateway protocol (BGP) routes onto the Internet for a block of Internet protocol (IP) addresses in order to cause at least some network traffic to certain destinations to be routed through the POP. While the present disclosure discusses embodiments in terms of deploying POPs, other variations are possible. For example, POPs may already be deployed by ISPs or other third-party entities. As illustrated in FIG. 4, an example virtual resource provider has data centers 402 in various countries throughout the world. For example, as illustrated, the resource provider has a couple of data centers 402 located in the United States, a data center 402 in Canada, and data centers located in other countries, such as Russia, Australia, Ukraine, and Denmark. Of course, the distribution of data centers for the resource provider is provided as an example for the purpose of illustration and generally a resource provider may operate data center facilities in one country, in multiple countries, and in ways different from that which is illustrated.

As shown in FIG. 4, each of the data centers 402 are associated with a POP 404 that the resource provider has deployed. In this manner, network traffic addressed to IP addresses advertised by the POPs are routed to the POPs to appropriate data centers accordingly. For example, network traffic may be routed to the data centers 402 in accordance with existing network routing protocols, such as BGP. As illustrated in FIG. 4, the POPs 404 are facilities different from the data centers 402. However, it should be noted that a data center and a POP may be located in the same facility. In addition, as illustrated in FIG. 4, each data center 402 is associated with a single corresponding POP. However, one POP may serve multiple data centers and a single data center may be served by multiple POPs.

In an embodiment, the resource provider that operates the facilities illustrated in FIG. 4, or variations thereof, advertises one or more blocks of IP addresses from multiple POPs, such as all of the POPs 404, or at least a subset thereof. A block of IP addresses may be a range or other set of IP addresses controlled by the resource provider. Thus, for example, a POP 404 in Russia may advertise a set of IP addresses that are also advertised by a POP 404 in the United States and, in some embodiments, by all POPs deployed by the resource provider.

As noted above, customers may utilize resources of a resource provider in various ways. In many instances, as noted, a resource provider may operate data centers in various geographic locations. Customers of the resource provider may utilize resources provided by the resource provider in one or more of those locations. A customer of a resource provider, for example, may operate virtual machine instances and/or other computing resources in multiple geographic regions for the purposes of fault tolerance, providing good performance (in terms of latency or other measurements of network performance) in multiple geographic areas and the like. While many examples are given in terms of virtual resources, and while virtualization of computing resources provide many advantages for those involved with management of the resources, it should be noted that the scope of the present disclosure is not limited to virtual resources, but is intended to include embodiments that utilize one or more physical resources (such as physical hosts, physical storage devices, and the like) instead of or in addition to virtual resources.

Figure 5:
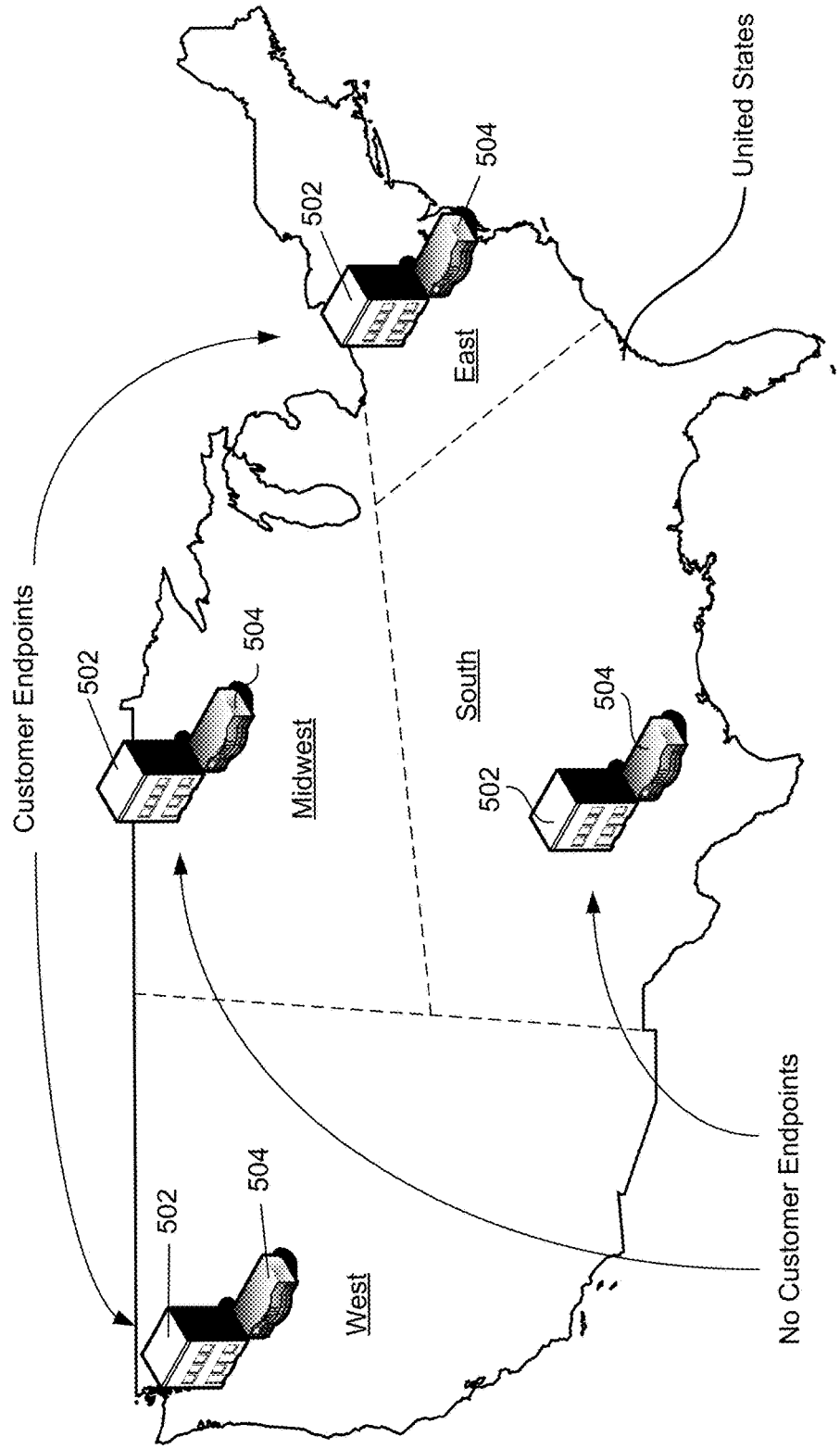
FIG. 5 illustrates a deployment of multiple POPs and a distribution of customer end points in accordance with at least one embodiment.

FIG. 5, accordingly, illustrates an example of how a customer may utilize resources of a resource provider. As shown in FIG. 5, a resource provider operates data centers 502 in connection with POPs 504 in a manner which may be similar to that described above in connection with FIG. 4. In this particular example, the resource provider operates a data center 502 and POP 504 in each of four regions of the United States: the West, the Midwest, the South and the East. Again, this particular manner of operating data centers and POPs is provided for the purpose of illustrated and variations are considered as being within the scope of the present disclosure. For example, a resource provider may operate multiple data centers within a geographic region. Further, multiple data centers within a region or even among multiple regions may be served by one or more of the same ISPs.

In an embodiment, a set of IP addresses is advertised by each of the POPs 504. For example, each of the POPs 504 may advertise BGP routes to other routers that participate in a network, such as the Internet, in which the POPs 504 participate. Thus, for an IP address in that set, the IP address is advertised, for example, by the POP 504 in the West and the POP 504 in the East. An IP address that is advertised simultaneously from multiple POPs may be referred to as an anycast address. In this illustrative embodiment, the advertised IP addresses may be Internet Protocol version four (IPv4) and/or Internet Protocol version six (IPv6) addresses. Network traffic addressed to such an address may be routed to one of the POPs 504 in accordance with various network routing protocols utilized in one or more networks of which the POPs 504 participate. For instance, in conventional Internet routing techniques, network traffic addressed to an IP address that is advertised by multiple POPs 504 may generally be routed to a closest POP, where "closest" can be measured in a variety of ways. Proximity may be based at least in part on, for example, geographic distance, a number of network hops between an originator of traffic and one or more POPs, latency, bandwidth capabilities, policy, transmission costs, and/or, generally, any aspect of network performance.

As illustrated in FIG. 5, a customer of the resource provider may utilize one or more of the IP addresses that are advertised from multiple POPs 504. For example, a customer may programmatically manage a virtual machine instance maintained by the resource provider from one of the data centers 502. The customer may assign one of the anycast IP addresses to the virtual machine instance. The virtual machine instance in this example may be referred to as an "endpoint." As will be discussed in more detail below, Internet traffic directed to the anycast IP address as a virtual machine instance may be routed to one of the POPs 504 and then to the data center 502 in which the virtual machine instance is implemented, that is, a data center in which a physical host implementing the virtual machine instance is located. Various techniques for routing network traffic may be used, including those described in application Ser. No. 13/069,727, entitled "Methods and Apparatus for Remapping Public Network Addresses on a Network to an External Network via an Intermediate Network" filed on Mar. 23, 2011 and application Ser. No. 13/069,719 entitled "Methods and Apparatus for Remapping Public Network Addresses on a Network to an External Network via a Private Communications Channel" and variations of those techniques. As shown in FIG. 5, the customer may house such virtual machine instances or other resources in multiple data centers. In an embodiment, the customer is able to assign an anycast IP address to both of the virtual machine instances or other resources. In FIG. 5, as an example, a customer has resources, referred to herein as endpoints, assigned a common anycast IP address in both the data center 502 in the West and the data center 502 in the East. Network traffic directed to the anycast IP address may be directed to a POP 504 and then to the appropriate data center 502, which may be, for example, the closest data center where proximity is measured in various ways; such as, for example, proximity may be based at least in part on geographical distance, latency, network hops and/or transmission costs, that is, the cost of transmitting information from one point to another.

Network traffic may be routed in other ways as well. For example, network traffic may be routed to a randomly selected data center.

As a particular example of routing network traffic, network traffic originating from the West region and addressed to the anycast IP address may be, in most instances, routed to the POP 504 in the West and past to the virtual machine instance or other resource in the data center 502 accordingly. Similarly, a network traffic originating from the East and addressed to the virtual machine instance or other resource in the data center 502 in the East may proceed to the POP 504 in the East and be routed to the virtual machine instance or other resource in the data center 502 in the East accordingly. Network traffic originating from the Midwest or South that is addressed to the anycast IP address may be routed to the POP 504 in the West or the POP 504 in the East depending on network routing protocols being utilized.

It should be noted that while the present disclosure describes a virtual machine instance or other resource as being assigned in anycast IP address, an IP address or other identifier may be assigned to various resources and groups of resources. For example, an anycast IP address may be directed to a cluster of servers. Traffic to the cluster may be regulated by use of a low-balancer or other appliance. An anycast IP address may be allocated to any addressable resource. Generally, an anycast IP address can be assigned in any way that a typical IP address may be assigned.

Figure 6:
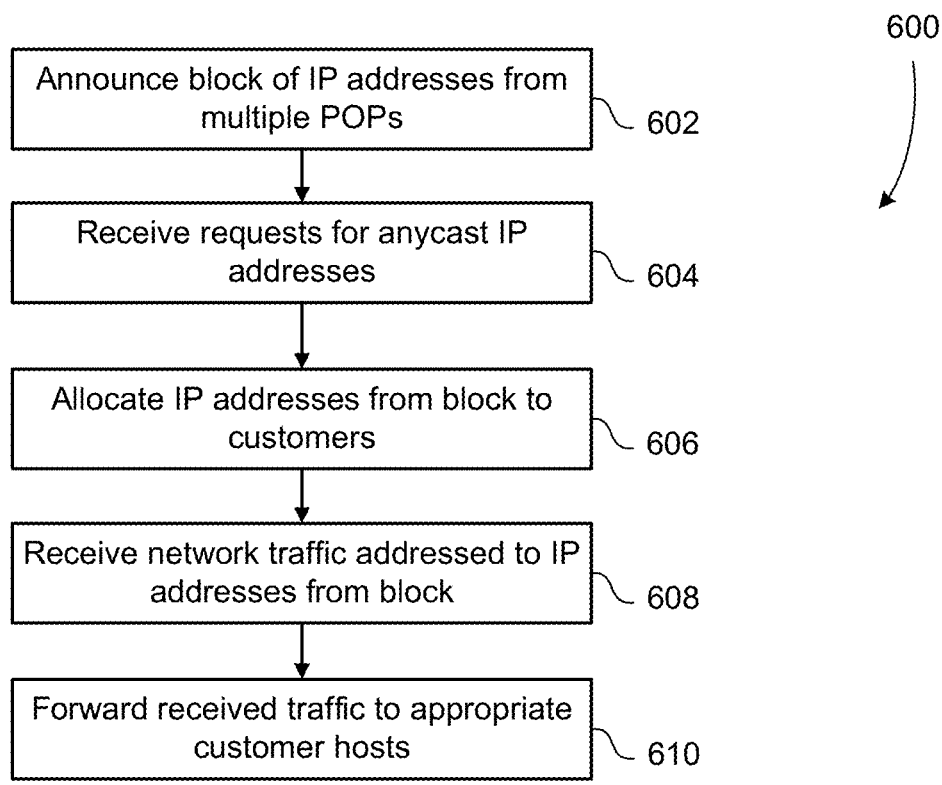
FIG. 6 shows example steps of a process for managing network traffic in accordance with an embodiment.

FIG. 6 shows an illustrative example of a process 600 for managing network traffic in accordance with an embodiment. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. Actions described and illustrated in connection with FIG. 6 may be performed as operations in a device or combination of devices that participate in management of network traffic. The code may be stored on a computer-readable storage medium, for example, in the form of a computer program comprising a plurality of instructions executable by one or more processors. The computer-readable storage medium may be non-transitory.

Embodiments of the present disclosure are, in many instances including in connection with FIG. 6, described in terms of customers of a resource provider, the scope of the present disclosure is intended to extend to other embodiments, such as when an organization utilizes one or more anycast IP addresses for its own purposes. In an embodiment, the process 600 includes announcing 602 a block of IP addresses from multiple POPs, such as in a manner described above. In an embodiment, requests for anycast IP addresses may be received 604. A customer of a resource provider, for example, may request an anycast IP address to be assigned to one or more resources that are programmatically controlled by the customer. Further, while FIG. 6 is described in terms of a request for an anycast IP address (in the singular) the request may be for multiple anycast IP addresses and the remainder of the process 600 may be modified from that which is explicitly described accordingly. It should also be noted that, as with any process described herein, while illustrated as sequential steps or operations, unless clear from context, actions of the process 600 may be performed in an order different from that which is described. For example, the requests for anycast IP addresses may be received at various times independent of when other actions of the process 600 are performed.

Figure 8:
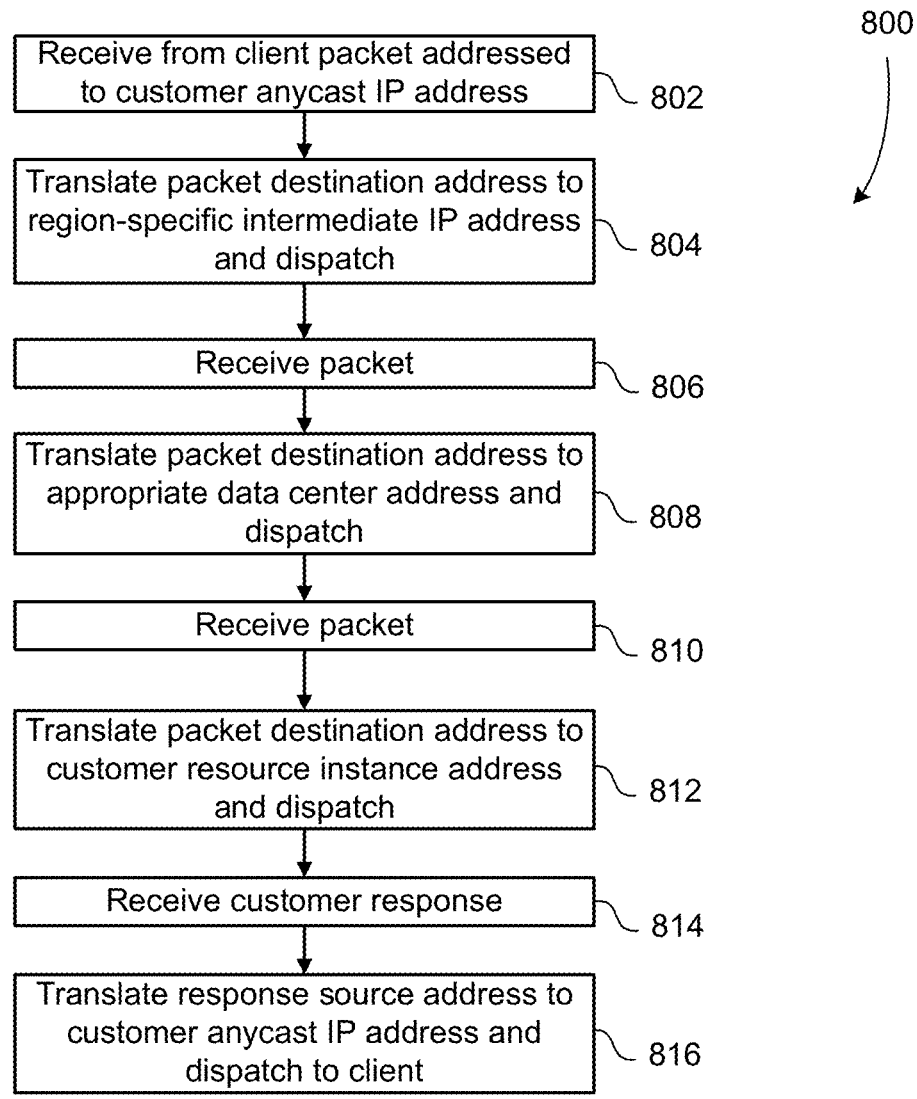
FIG. 8 shows example steps of a process for managing network traffic to a customer in accordance with at least one embodiment.

When the requests for anycast IP addresses are received 604, IP addresses may be allocated 606 from the block to customers that made the requests. The customers may, for example, assign the allocated IP addresses to their resources so that the resources can receive communications dispatched to the allocated IP addresses. Accordingly, network traffic addressed to IP addresses from the block may be received 608. The network traffic may be received by a device in a facility of a resource provider, such as illustrated in FIGS. 4 and 5. Such traffic may be then forwarded 610 to appropriate hosts of the customers, that is, hosts to which the allocated anycast IP addresses have been assigned. Various network address translation techniques, including those described in U.S. application Ser. No. 13/069,727, entitled "Methods and Apparatus for Remapping Public Network Addresses on a Network to an External Network via an Intermediate Network" filed on Mar. 23, 2011 and application Ser. No. 13/069,719 entitled "Methods and Apparatus for Remapping Public Network Addresses on a Network to an External Network via a Private Communications Channel" and variations of those techniques and variations thereof may be used to forward received traffic to the appropriate hosts of the customers. FIG. 8, described below, shows an illustrative example of a process that may utilize various network address translation techniques.

Figure 7:
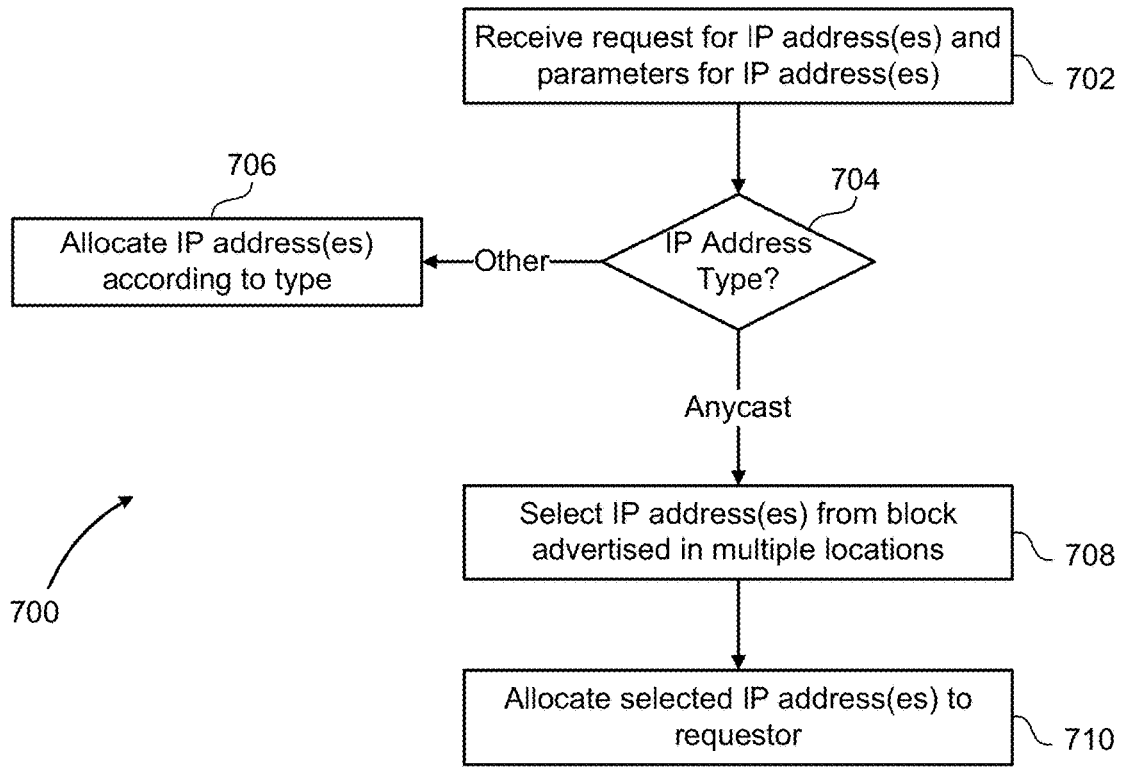
FIG. 7 shows example steps of a process for allocating IP addresses in accordance with an embodiment.

In many instances, not all customers of a resource provider require the use of an anycast IP address. Some customers, for example, may manage their resources using different IP addresses advertised from different locations. FIG. 7 accordingly shows an illustrative example of a process 700 for allocating anycast IP addresses in accordance with an embodiment. In this example, the process 700 includes receiving 702 a request for one or more IP addresses and parameters for those IP addresses. The parameters may state, for example, whether or not the addresses should be anycast IP addresses. The parameters may also specify additional information, such as identifiers of resources to which the requested IP addresses are to be assigned, and the like. Upon receipt of the request, a determination may be made 704 of the address type based at least in part on the received parameters. If it is determined that the address type is not in anycast IP address type, then the one or more IP addresses may be allocated 706 according to the type. For instance, if the request was for conventional IP addresses, the IP addresses may be allocated utilizing conventional methods. For example, the IP address may be assigned to a resource and may be advertised from a single POP. If, however, it is determined that the IP address type of the request was an anycast IP address type, then in an embodiment, one or more IP addresses are selected 708 from a block of IP addresses that is advertised in multiple locations, such as a block that is advertised from all POPs operated by a resource provider. Once the IP addresses have been selected, they may then be allocated 710 to the requestor, which may be a customer of a resource provider, where allocation may be performed as described above.

As discussed, when customers have been allocated anycast IP addresses, various techniques may be utilized in order to manage network traffic addressed to such anycast addresses. For example, FIG. 8 shows an illustrative example of a process 800 for managing traffic addressed to an anycast IP address. The process 800 may be performed collectively by a plurality of network devices of an organization (or group of organizations). Devices that collectively perform the process 800 (or any process) may be referred to as a system. As illustrated, the process 800 of FIG. 8 describes management of network traffic addressed to a resource of a customer of a resource provider. It should be noted, however, that the process 800, and other processes herein, may be modified in accordance with different embodiments. For instance, the process 800 may be used by an organization to manage its own resources. Returning to the embodiment illustrated in FIG. 8, a packet addressed to a customer anycast IP address is received 802. The packet may be, for example, received at one of multiple POPs that have been deployed in various geographic locations by a computing resource provider. The packet may be received by other POPs, such as POPs operated by third parties. The packet may be received by a client outside of a network, which may be a private network, that includes one or more computer systems being used to perform the process 800. In an embodiment, the packet destination address is translated 804 to a region-specific intermediate IP address and dispatched accordingly. For instance, in an embodiment, a POP may direct traffic addressed to an anycast IP address to a data center in the same region, such as a data center 502 shown in FIG. 5. In an embodiment, such a data center (in particular, a device of the data center, such as a network translation device) may receive 806 the packet and translate 808 the packet destination address to an appropriate data center address and dispatch the packet. Translating the packet may include modifying the packet such that the modified packet has a destination address of another data center, but the packet still includes information identifying the intended destination of the original packet. Techniques for modifying a packet include, but are not limited to, techniques described in application Ser. No. 13/069,727, entitled "Methods and Apparatus for Remapping Public Network Addresses on a Network to an External Network via an Intermediate Network" filed on Mar. 23, 2011 and application Ser. No. 13/069,719 entitled "Methods and Apparatus for Remapping Public Network Addresses on a Network to an External Network via a Private Communications Channel" and variations of those techniques.

It should be noted that it may not be necessary to translate the packet destination address at this particular point in the process 800 if, for example, a customer resource corresponding to the anycast address is in the same data center that has received the packet. If, however, the packet has been translated and dispatched 808, the packet may be then received 810 by a device in another data center. The received packet's destination address may be then translated 812 to a customer resource address and dispatched accordingly. The packet's destination address may be the original destination packet that was received 802, or may be another address that corresponds to the customer resource. For example, in an embodiment, resources are assigned both public IP addresses and private IP addresses. Clients outside of a resource provider may send communications to public IP addresses of resources of a customer of the resource provider. When such communications are received by the resource provider, the resource provider may utilize various network address translation techniques to route the communications using the private IP addresses. A mapping between private and public IP addresses may be maintained to facilitate such use of IP addresses. Accordingly, in an embodiment, translating 812 the packet destination address may include modifying a packet to have a destination address that is different from a destination address that the packet originally had when received. Of course, in some embodiments, the packet may be given the same destination address as the packet originally had when originally dispatched. As noted, various techniques for network address translation that may be used include those described in U.S. application Ser. No. 13/069,727, entitled "Methods and Apparatus for Remapping Public Network Addresses on a Network to an External Network via an Intermediate Network" filed on Mar. 23, 2011 and application Ser. No. 13/069,719 entitled "Methods and Apparatus for Remapping Public Network Addresses on a Network to an External Network via a Private Communications Channel" and variations of those techniques.

In many instances, the network traffic that was originally addressed to the anycast IP address may be a request for which a response is desired. The request may be, for example, a request for information. The network traffic may also correspond to communications for which at least an acknowledgement is desired. A customer resource may respond to such communications accordingly. For instance, a customer resource may be a physical or a virtual server that provides web pages or other information upon request. If such a response is made by the customer (i.e. by a computing resource of the customer), the customer's response may be received 814, such as by the data center in which the response originated. As noted, while various embodiments are described in terms of customers, the techniques of the present disclosure are not limited to customers. For example, the response may be made generally by a device which does not necessarily correspond to a customer of a computing resource provider. Returning to the specific example embodiment of FIG. 8, a source address may be translated 816 to the customer anycast IP address and dispatched to the client that submitted the original request. The response may be, for example, dispatched onto the Internet where various protocols will be utilized to route the response to the client. Further, the response may be sent to a POP that dispatches the response onto the Internet. The POP may be the POP that received the original packet or another POP, such as a POP selected based at least in part on policy, geographic distance, network hops, latency, bandwidth, data transmission costs, and/or other factors. The response may also be sent to the client in other ways. For instance, the request may be routed to another facility of the resource provider, such as the facility that originally received 802 the request, and then dispatched onto the Internet or other network.

Figure 9:
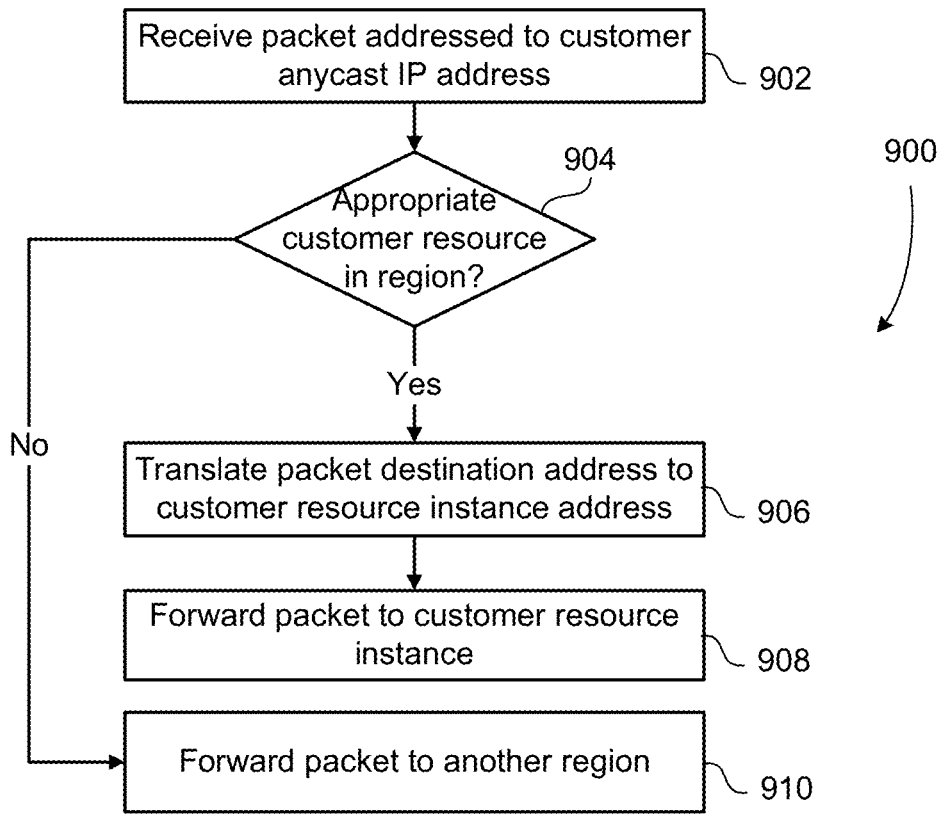
FIG. 9 shows example steps of a process for managing network traffic in accordance with at least one embodiment.

As noted, traffic addressed to an anycast IP address may need to be processed according to the manner in which customer resources have been allocated. Accordingly, FIG. 9 shows an illustrative example of a process 900 for managing traffic addressed to an anycast IP address. The process may be performed by a system, such as a system that is configured to perform the process 800 described above in connection with FIG. 8. In an embodiment, the process 900 illustrated in FIG. 9 includes receiving 902 a packet addressed to a customer in anycast IP address, such as in a manner described above in connection with FIG. 8 or elsewhere. A determination may be made 904 whether a customer associated with the anycast IP address has resources in the region in which the packet was received. For example, a determination may be made whether or not the customer has resources in the same data center in which the process 900 is being performed. A network translation device, such as described elsewhere herein, may make the determination, such as by referencing a routing table. Any suitable device, however, may make the determination. If it is determined 904 that the customer houses an appropriate resource in the region, then the packet destination address may be translated 906 to the customer resource instance address in that region. The packet with the translated address may be then forwarded 908 to the customer resource instance. The customer may, if appropriate, respond and a response may be handled accordingly, such as in a manner described in connection with FIG. 8.

Figure 10:
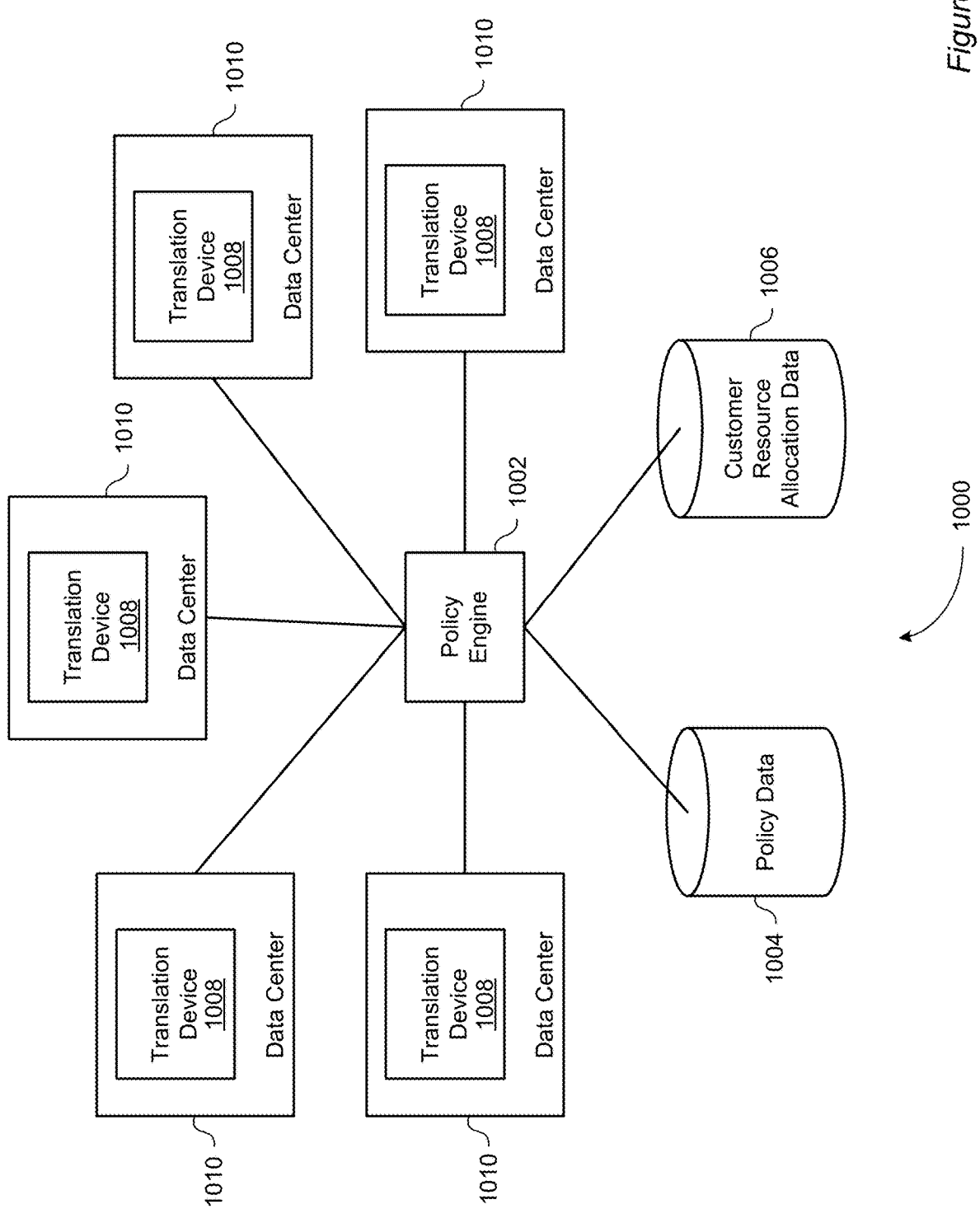
FIG. 10 illustrates an example environment for network traffic policy management in accordance with at least one embodiment.

The managing of network traffic such as in a manner described above and elsewhere may be managed by the use of policies where a policy may be one or more rules for routing network traffic that may be applied to network traffic as it is received. FIG. 10 shows an illustrative example of an environment 1000 for managing policies in accordance with an embodiment. As shown in FIG. 10, the environment 1000 includes a policy engine 1002 which may be one or more devices that are operable to analyze data in order to determine policies that may be used for routing network traffic. As shown in FIG. 10, a customer resource allocation data is stored in a data store 1006 and utilized by the policy engine 1002. Customer resource allocation data may include data that indicates information about customer resources, such as where resources are deployed, which anycast or other IP addresses are assigned to the resources, customer preferences for utilization of the resources and the like. Customer preferences may also include information about customer preferences for routing information to the resources. For instance, a customer may have two resource instances and may desire that a certain percentage of network traffic be routed to one instance, while another percentage of traffic be routed to another instance. The percentages may not be equal, such as if one instance has capabilities different from the other.

Once it determines policies, the policy engine may store the policies in a policy data store 1004. The policy engine 1002 in an embodiment also is operable to push policy data to translation devices 1008 of various data centers 1010. The policy information pushed from the policy engine 1002 to a translation device 1008 may be a table or other data structure that may be utilized by the translation device to translate IP addresses. For example, a table may associate an anycast IP address with another IP address to which traffic directed to the anycast IP address should be translated. The policy engine 1002 may push tables to the translation devices 1008 or other information that enables the translation devices 1008 to build such a table or other data structure that allows the translation devices to act according to the policies determined by the policy engine 1002. It should be noted that the policy information pushed to each translation device 1008 by the policy engine 1002 may differ. For example, the policy information may indicate that one translation device 1008 should route traffic to an anycast IP address in one manner, while information pushed to another translation device may indicate that network traffic addressed to the same anycast IP address should be routed in a different manner. For instance, one translation device may be instructed to route traffic to an anycast IP address to a data center in one geographic region, while another translation device may be instructed to route network traffic to the same anycast IP address to an IP address for a device in another region. It should also be noted that while the policy engine 1002, policy data store 1004 and customer resource allocation data store 1006 are illustrated as being outside of a data center, the policy engine and data stores may be located in one or more of the data centers. In addition, while the policy engine 1002, policy data store 1004 and customer resource allocation data store 1006 are illustrated being separate components, they may be all part of a single device or single system.

Figure 11:
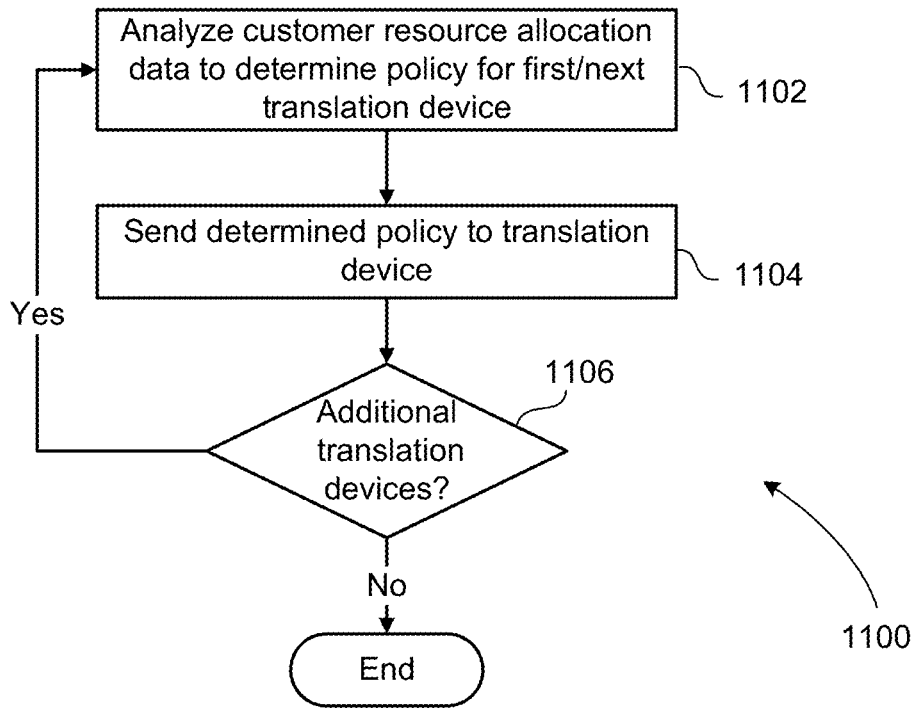
FIG. 11 shows example steps of a process for policy distribution in accordance with at least one embodiment.

FIG. 11 shows an illustrative example of a process 1100 of how the policy engine 1002 of FIG. 10 may analyze customer resource allocation data and push the policy information to translation device. As noted, the analysis may be based upon aspects of the manner in which customer resources are allocated, network characteristics of a network in which the customer resource and/or a data center hosting the customer resource participates, customer preferences, and the like. A policy may enable a translation device of a data center to route network traffic in a particular manner, when such a manner is available. For instance, referring to FIG. 5, a policy for the data center 502 of the Midwest for an anycast IP address may indicate that network traffic to the anycast IP address received by the data center 502 in the Midwest should be routed to the data center 502 in the West. A policy for the data center 502 in the South may similarly indicate that network traffic to the anycast IP address received by the data center 502 in the South should be routed to the data center 502 in the East. In this manner, because the example customer in FIG. 5 does not have endpoints for the anycast IP address in the Midwest or South regions (although the customer may have other resources there), network traffic to the anycast IP address is routed so that the endpoints of the anycast IP address each receive a share of the traffic. More complex policies may also be used to route traffic. In this example, if a data center 502 in the Midwest or South was unable to route such traffic to the data centers 502 in the West or East, respectively, the data centers may detect such an inability and route the traffic in a different manner. For instance, the data center 502 in the Midwest may route traffic addressed to the anycast IP address to the data center 502 in the East if unable, for some reason, to route the traffic to the data center 502 in the West.

Once the policy for the first translation device is determined 1102, the determined policy may be sent 1104 to the translation device. A determination may be made then 1106 whether there are additional translation devices for which a policy should be determined. If there is, then the customer resource allocation data may be analyzed to determine a policy for the next translation device as illustrated in the figure. The determined policy may be then sent 1104 to the translation device and the translation and the determination whether there are additional translation devices may be made 1106 again.

This process may be repeated until it is determined that there are no additional translation devices. It should be noted that as with other processes described herein, variations of the process 1100 are considered as being within the scope of the present disclosure. For example, FIG. 11 shows a particular order of actions where customer resource allocation data is analyzed and then sent to an appropriate translation device before a determination is made whether or not to do that again. However, customer resource allocation data may be analyzed and policies may be determined for all translation devices all at once before the policies are pushed in the translation devices. Generally, unless noted or otherwise clear from context, the various actions described in accordance with the illustrated processes may be performed in orders different from that which is illustrated. Other variations are also considered as being within the scope of the present disclosure and, generally, any manner of analyzing customer resource allocation data and sending policies that have been determined in accordance with the analysis may be utilized.

As noted above, there are a wide variety of ways in which customers may utilize resources of a resource provider. In addition, customer use of a resource provider's resources may vary over time. A customer of a resource provider, for example, may increase or decrease the amount of resources utilized by the customer as needed. As the customer's use of resources of a resource provider changes, policies that have been pushed to translation devices may need to be updated accordingly. For example, referring to FIG. 5, a customer that has endpoints associated with an anycast address in multiple regions may want to add an endpoint to another region. For example, referring to FIG. 5, the customer illustrated in the figure, may wish to add resources associated with the anycast IP address in the data center 502 in the South. This may be done for various reasons, such as to make the customer systems more robust in case of fault of one of the data centers 502 or in order to provide a more geographically balanced system so that customers or a customer can enjoy consistent performance.

Figure 12:
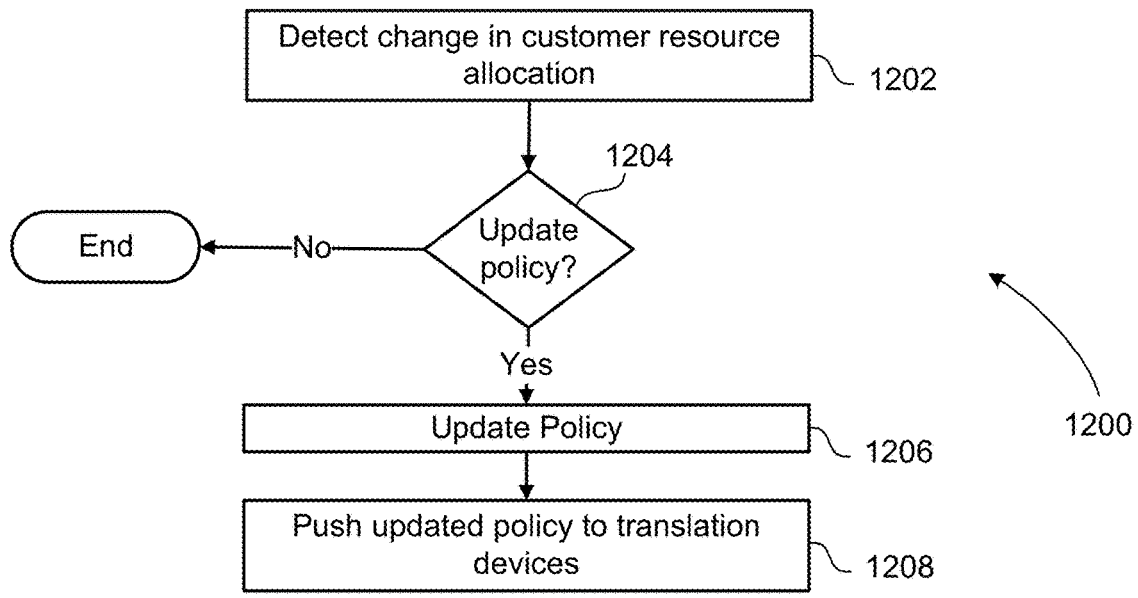
FIG. 12 shows example steps of a process for managing network traffic policies upon detection of customer resource changes in accordance with at least one embodiment.

FIG. 12 shows an illustrative example of a process for managing policies in accordance with changes in the use of resources by customers. In an embodiment, the process 1200 includes detecting 1202 a change in customer resource allocation. It may be detected, for example, that the customer has added resources in one or more data centers, has moved resources in one or more data centers, has removed resources in one or more data centers, or has otherwise changed the manner in which a customer is utilizing resources of the resource provided. A determination is made 1204 whether to update any applicable policies. A determination may be made, for example, based at least in part on whether or not the customer utilizes any anycast IP addresses, whether or not the change in customer resource allocation changes a geographic distribution of the customer resources, whether or not any customer preferences have changed, and the like. Determining whether to update the policy may be done in any suitable manner. For example, determining whether or not to update the policy may include simply determining the policy and comparing the policy with the policy currently in place. If it is determined 1204 to update a policy, then the policy is updated 1206 accordingly. The policy may be pushed 1208 or otherwise sent to one or more translation devices to enable the translation devices to operate in accordance with the updated policy.

Figure 13:
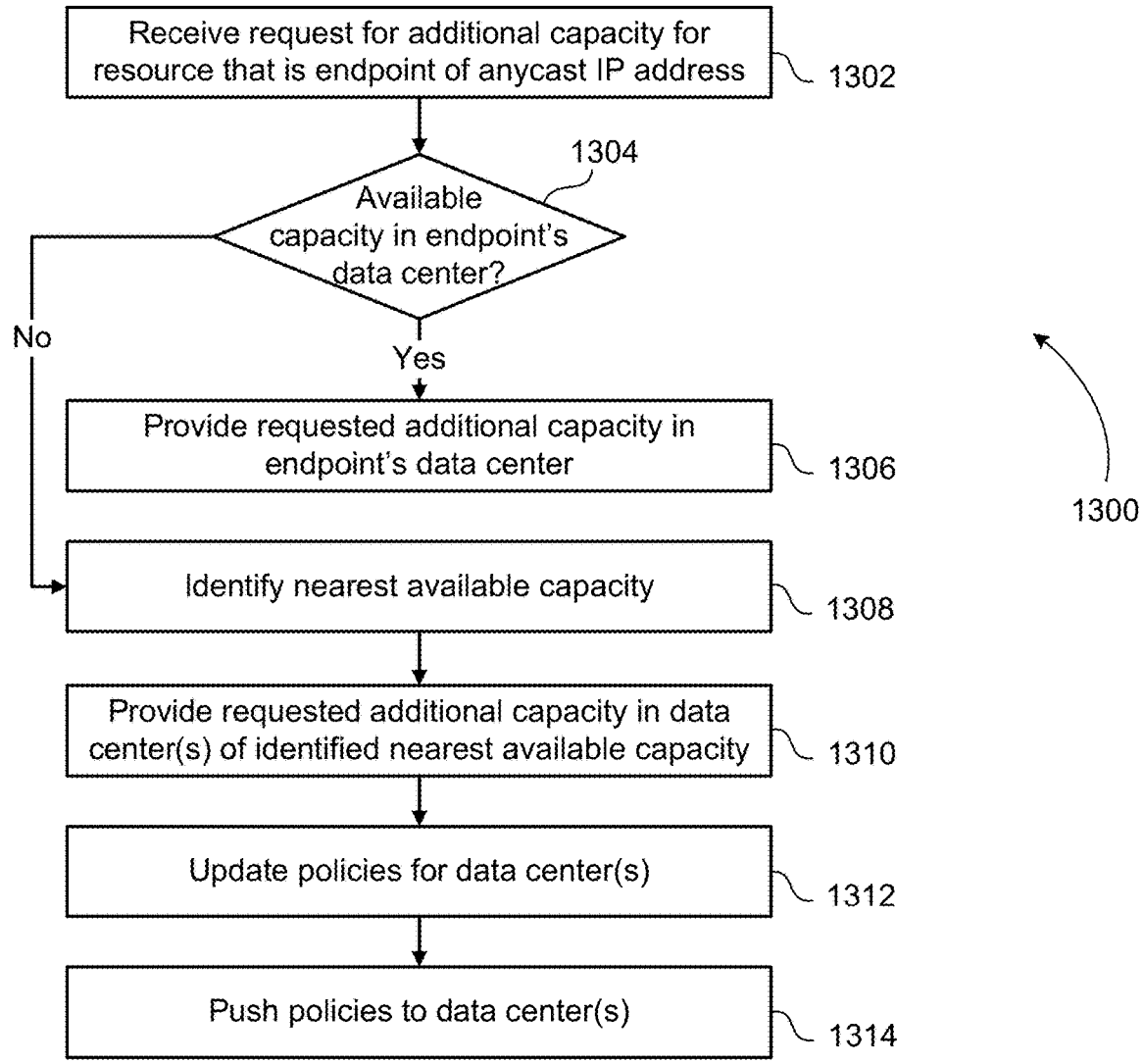
FIG. 13 shows example steps of a process for provisioning computing resources for a customer in accordance with at least one embodiment.

FIG. 13 shows an illustrative example of a process 1300 for managing changes in customer resource allocation in accordance with an embodiment in which the customer requests additional capacity. A customer, for example, may utilize the resources of a resource provider to provide a service to the other customers. The capacity of the resource provider needed by the customer to provide the service may change over time. For example, if demand for the service increases, more virtual resource instances may be needed in order to provide the service. Accordingly, in an embodiment, the process 1300 includes receiving 1302 a request for additional capacity for a resource that is an endpoint of an anycast IP address. As an example, the anycast IP address may correspond to a load balancer device. The request for additional capacity may be made by or at least in connection with a request to register one or more additional servers with the load balancer. Further, the request may be received, for example, from a customer of a resource provider or may be received as part of an automatic process, such as a process utilized by the resource provider in order to provide an auto scaling service for the customer. In an embodiment, a determination may be 1304 whether there is available capacity in the endpoint's data center.

Because the resource provider may serve multiple customers and/or because of other limitations, it may be the case that additional capacity needed to satisfy the request is not available in the same data center. If it is determined 1304 that there is available capacity in the endpoint's data center, then the requested additional capacity may be provided 1306 in the endpoint's data center. Providing the additional capacity may be performed in any simple manner, such as by provisioning additional virtual machine instances in order to satisfy the request. If, however, it is determined that there is additional capacity in the endpoint's data center, then the nearest available capacity may be identified 1308. As discussed above, proximity may be determined in various ways and nearest does not necessarily indicate geographical proximity. Additional capacity may, for example, be identified in one or more other data centers that are geographically close to the data center of the endpoint or otherwise close, such as according to a number of network hops, latency values measured, or one or more other metrics. Once the additional capacity has been provided or at another suitable time, which may be before the additional capacity is provided, one or more policies for the applicable data centers are updated 1312. Updating the policies may be performed in any suitable manner, such as described above. Updating the policies may be performed, for example, by determining how network traffic should be routed such that network to the anycast address is evenly distributed or otherwise desirably distributed. The updated policies may be then pushed or otherwise sent 1314 to the data centers for which the policies were updated.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining computing resources that comprise a plurality of endpoints and that are distributed among a subset of a plurality of geographically separated private networks of a service provider network, the plurality of endpoints associated with a common network destination identifier, the computing resources being associated with a client network, wherein the plurality of geographically separated private networks are associated with a plurality of point of presences (POPS);

receiving, from a public network onto a particular private network of the geographically separated private networks of the service provider network, network traffic addressed to the common network destination identifier;

determining that the particular private network does not host any of the plurality of endpoints; and routing the network traffic from the particular private network to one of the subset of the plurality of geographically separated private networks, wherein the particular private network and the one of the subset of the plurality of geographically separated private networks are associated with two different POPs that are configured to route the network traffic based at least in part on the common network destination identifier.

2. The computer-implemented method of claim 1, further comprising:

receiving client input indicating a request to assign the common network destination identifier to the plurality of endpoints; and updating, based at least in part on the client input, a mapping associated with at least the subset of the plurality of geographically separated private networks, the mapping indicating that the common network destination identifier is assigned to the plurality of endpoints, wherein the network traffic is routed based at least in part on the mapping.

3. The computer-implemented method of claim 1, further comprising routing the network traffic to an endpoint of the plurality of endpoints that is hosted in the one of the subset of the plurality of geographically separated private networks, wherein the endpoint comprises a virtual machine instance of a client of the service provider network.

4. The computer-implemented method of claim 1, wherein the common network destination identifier is assigned to the plurality of endpoints based at least in part on client input indicating a selection of the common network destination identifier from among a block of network destination identifiers.

5. The computer-implemented method of claim 4, further comprising publicly announcing the block of network destination identifiers from the plurality of geographically separated private networks.

6. The computer-implemented method of claim 5, further comprising publicly announcing the block of network destination identifiers by at least announcing Border Gateway Protocol routes to Internet routes for the common network destination identifier.

7. The computer-implemented method of claim 5, wherein the block of network destination identifiers comprises anycast Internet protocol (IP) addresses.

8. The computer-implemented method of claim 1, wherein the network traffic is routed based at least in part on a mapping of the common network destination identifier to one or more addresses of the computing resources, and further comprising: identifying the one of the subset of the plurality of geographically separated private networks based at least in part on the mapping.

9. The computer-implemented method of claim 1, wherein determining that the particular private network does not host any of the plurality of endpoints comprises:

modifying the common network destination identifier to an address of a device; and determining that the particular private network lacks the device having the address, wherein the network traffic is routed based at least in part on the address of the device.

10. A system, comprising:
one or more processors; and
one or more non-transitory computer readable storage media comprising instructions that, upon execution by the one or more processors, cause the system to at least:

maintain computing resources that comprise a plurality of endpoints and that are distributed among a subset of a plurality of geographically separated private networks of a service provider network, the plurality of endpoints associated with a common network destination identifier, the computing resources being associated with a client network, wherein the plurality of geographically separated private networks are associated with a plurality of point of presences (POPs);

receive, from a public network onto a particular private network of the geographically separated private networks of the service provider network, network traffic addressed to the common network destination identifier;

determine that the particular private network does not host any of the plurality of endpoints; and route the network traffic from the particular private network to one of the subset of the plurality of geographically separated private networks, wherein the particular private network and the one of the subset of the plurality of geographically separated private networks are associated with two different POPs that are configured to route the network traffic based at least in part on the common network destination identifier.

11. The system of claim 10, wherein the one or more non-transitory computer readable storage media comprise additional instructions that, upon execution by the one or more processors, further cause the system to at least:

assign the common network destination identifier to the plurality of endpoints based at least in part on a selection of the common network destination identifier from a plurality of publicly announced network destination identifiers.

12. The system of claim 10, wherein the one or more non-transitory computer readable storage media comprise additional instructions that, upon execution by the one or more processors, further cause the system to at least:

host an additional endpoint in a private network of the subset of the plurality of geographically separated private networks;

change a mapping of the common network destination identifier to virtual machine instances; and route, to the additional endpoint and based at least in part on the mapping as changed, additional network traffic received from the public network and destined to the common network destination identifier.

13. One or more non-transitory computer-readable storage media storing instructions that, upon execution by one or more processors, cause a system to perform operations comprising:

maintaining computing resources that comprise a plurality of endpoints and that are distributed among a subset of a plurality of geographically separated private networks of a service provider network, the plurality of endpoints associated with a common network destination identifier, the computing resources being associated with a client network, wherein the plurality of geographically separated private networks are associated with a plurality of point of presences (POPS);

receiving, from a public network onto a particular private network of the geographically separated private networks of the service provider network, network traffic addressed to the common network destination identifier;

determining that the particular private network does not host any of the plurality of endpoints; and routing the network traffic from the particular private network to one of the subset of the plurality of geographically separated private networks, wherein the particular private network and the one of the subset of the plurality of geographically separated private networks are associated with two different POPs that are configured to route the network traffic based at least in part on the common network destination identifier.

14. The one or more non-transitory computer-readable storage media of claim 13, wherein routing the network traffic is based at least in part on a policy that associates the common network destination identifier with a network address to which the network traffic is to be sent.

15. The one or more non-transitory computer-readable storage media of claim 14, wherein the policy is defined based at least in part on one or more of: a geographic location of the particular private network, compute capacity of the particular private network, or a number of network hops between the particular private network and the one of the subset of the plurality of geographically separated private networks.

16. The one or more non-transitory computer-readable storage media of claim 14, wherein the operations further comprise:

determining a change to at least one of the computing resources;

modifying the policy based at least in part on the change; and route, to an endpoint and based at least in part on the policy as modified, additional network traffic received from the public network and destined to the common network destination identifier.

17. The one or more non-transitory computer-readable storage media of claim 13, wherein the common network destination identifier comprises an Internet protocol (IP) address associated with a load balancer.

18. The computer-implemented method of claim 1, wherein determining that the particular private network does not host any of the plurality of endpoints comprises determining that lacks any devices accessible using the common network destination identifier.

19. The computer-implemented method of claim 1, further comprising:

assigning the common network destination identifier to the plurality of endpoints; and updating a mapping indicating that the common network destination identifier is assigned to the plurality of endpoints.

* * * * *